United States Patent
Leipelt et al.

(10) Patent No.: US 6,557,512 B2
(45) Date of Patent: May 6, 2003

(54) ADJUSTABLE INTAKE PIPE

(75) Inventors: Rudolf Leipelt, Hessigheim (DE); Olaf Weber, Friolzheim (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/873,114

(22) Filed: Jun. 4, 2001

(65) Prior Publication Data

US 2002/0020382 A1 Feb. 21, 2002

Related U.S. Application Data

(63) Continuation of application No. PCT/EP99/08755, filed on Nov. 13, 1999.

(30) Foreign Application Priority Data

Dec. 3, 1998 (DE) .......................................... 198 55 734

(51) Int. Cl.$^7$ ................................................ F02M 35/10
(52) U.S. Cl. .............................. 123/184.55; 123/184.57
(58) Field of Search ...................... 123/184.55, 184.42, 123/184.57, 184.34, 184.24, 184.53

(56) References Cited

U.S. PATENT DOCUMENTS 5,056,473 A * 10/1991 Asaki et al. ........... 123/184.31
6,328,011 B1 * 12/2001 Jessberger et al. ..... 123/184.57

FOREIGN PATENT DOCUMENTS

| DE | 3608310 | 9/1987 |
| DE | 3940486 | 6/1991 |
| DE | 9303172 | 6/1993 |
| GB | 1012425 | 4/1964 |
| GB | 2160264 | 12/1985 |
| WO | 9835146 | 8/1998 |

* cited by examiner

*Primary Examiner*—Tony M. Argenbright
*Assistant Examiner*—Katrina B. Harris
(74) *Attorney, Agent, or Firm*—Crowell & Moring LLP

(57) ABSTRACT

An adjustable intake pipe, especially for supplying combustion air to an internal combustion engine, which includes a collector chamber arranged in an essentially cylindrical control element. The collector chamber has a larger volume than required for the air supply, so the chamber is not used efficiently. In the invention, the collector chamber volume is used by arranging additional components of the intake tract defined by the intake pipe, i.e. of an internal combustion engine, within the collector chamber (11), for example, by arranging a resonance chamber (20) therein with the resonance chamber connected to the air supply system by through holes (19). This arrangement better utilizes the chamber volume and is particularly advantageous in motor vehicle engine compartments where limited space is available. The intake system also is more compact and has a lower overall weight.

7 Claims, 2 Drawing Sheets

ADJUSTABLE INTAKE PIPE

CROSS REFERENCE TO RELATED APPLICATIONS

This application is a continuation of international application no. PCT/EP99/08755, filed Nov. 13, 1999, which is incorporated herein by reference.

FIELD OF THE INVENTION

The invention relates to an adjustable intake pipe, particularly for supplying combustion air to an internal combustion engine. Adjustment is ensured by a control element, which simultaneously forms the collector chamber of the intake pipe.

BACKGROUND OF THE INVENTION

Such adjustable intake pipes are known, for instance, from published German patent application no. DE 36 08 310. In this device, the intake air is guided into a control element in the form of a hollow cylinder, which serves as a collector chamber. The outer wall of the control element together with the inner walls of the intake pipe housing forms the annular intake ducts leading to the cylinders. By rotating the control element, the angular position of the opening between the collector chamber and the intake ducts can be adjusted. This permits a continuous (i.e., stepless) adjustment of the intake duct length, so that the vibration conditions within the intake pipe can be optimally adapted to the load condition of the internal combustion engine.

If the intake ducts to the cylinders are arranged in the form of a ring around the collector chamber, the circumference of the collector chamber and thus also its volume are determined by the required length of the intake ducts. This mechanical interrelationship holds true irrespective of whether the cylindrical shell of said collector chamber is used as a control element. The volume created, however, is not required on this order of magnitude. This is a disadvantage since space is unnecessarily wasted even though engine space in motor vehicles is tight.

It is known in the art to use the cylindrical collector chamber for installing other components of the air conduction system. GB 10 12 425, for instance, proposes to install a round filter cartridge, which is supported against the end faces of the intake pipe housing to form a seal. Installing a round filter cartridge as described above, however, means eliminating the adjustability of the intake pipe. This is due to the problem that the round filter cartridge must communicate with the locally fixed air inlet of the intake pipe. In many cases, however, adjustability of the intake pipe cannot be dispensed with, due to the requirement for engine output or efficiency of the associated internal combustion engine.

Thus, despite the efforts of the prior art, there has remained a need for a space-efficient, adjustable intake pipe arrangement.

SUMMARY OF THE INVENTION

It is thus an object of the invention to provide a intake pipe which makes it possible to adjust the intake duct length by means of a movable collector chamber shell and, at the same time, optimally uses the clearance required by the unit.

This and other objects are advantageously achieved by providing an adjustable intake pipe comprising a housing having an inlet which opens into a collector chamber defining a volume, the collector chamber having at least one intake duct branching off therefrom; the housing further having at least one outlet per intake duct, wherein the collector chamber is formed by a movably supported control element, and wherein at least one other component of an intake tract formed by the intake pipe is accommodated within the volume of the collector chamber; the at least one component comprising at least one resonance volume, the resonance volume being formed within the collector chamber by at least one partition which has at least one opening and which forms a closed volume.

The intake pipe according to the invention has a collector chamber into which the inlet for the combustion air opens. The collector chamber is formed by a control element having passages to the annular intake ducts. Rotating the control element causes the length of the intake duct to be adjusted. The intake ducts lead to the cylinder-side outlets where the combustion air is introduced into the cylinder head of the internal combustion engine.

In view of the air conduction requirements, the cross section of the collector chamber is overdimensioned. This volume is therefore used to install other functional components of the intake tract. Advantageously, the components can be fixedly connected to either the control element or the housing. To ensure support in the respectively other component, a flexible bearing must be provided. This is necessary particularly in components with relatively large dimensions, since they are located in a pulsating airflow in the collector chamber and are thus subject to vibration stress. The functional components may also be movably mounted in the intake pipe or in the control element.

This makes use of a volume, which must in any event be provided for the intake pipe. This saves space, which functional components would take up in the engine compartment if they could not be accommodated in the intake pipe. In addition, a higher integration density of the components of the engine unit is obtained. As a result, the complexity of the final assembly is reduced. The compact design also reduces the weight.

One advantageous embodiment of the invention provides for an air filter cartridge as the functional component. On the unfiltered air side the air filter cartridge communicates with the inlet of the intake pipe. After the intake air has passed through the filter medium, it reaches the actual collector chamber of the intake pipe. It is advantageous to provide a fixed connection between the intake end of the intake pipe for the unfiltered combustion air and the raw (i.e., unfiltered) air inlet of the preferably cylindrical filter cartridge. A rotatable support may be effected on the end face of the control element opposite the air intake. In principle, however, a fixed support of the filter cartridge in the control element is also possible, in which case a flexible connection is required between the filter cartridge and the air inlet.

According to a further embodiment of the inventive concept, the component may comprise one or more resonance volumes, which communicate with the intake pipe volume by means of an opening. The resonance volumes act as dampers for undesirable air oscillations which build up in the intake pipe. To that extent this measure can improve the acoustic behavior of the intake pipe.

It is advantageous to use parts of the control element wall for the resonance volumes. A fixed connection between the resonance volumes and the control element is therefore suggested. Through a corresponding support in the intake pipe housing, the openings connecting the resonance volumes and the intake pipe volume can be closed and opened. Here, the relative motion between control element and intake pipe housing required by the position of the intake duct length can be utilized. The resonance volumes required for damping the undesirable vibration conditions in the intake pipe can then be added as a function of the operating state of the engine. For a partial addition it is also feasible to incrementally open one or more openings to the resonance volumes. Accommodating additional functional components in the collector chamber of the intake pipe permits better utilization of the engine space.

These and other features of preferred further developments of the invention are set forth in the claims as well as in the description and the drawings. The individual features may be implemented either alone or in combination in embodiments of the invention and/or in other fields of application and may represent advantageous embodiments that are protectable per se, for which protection is hereby claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
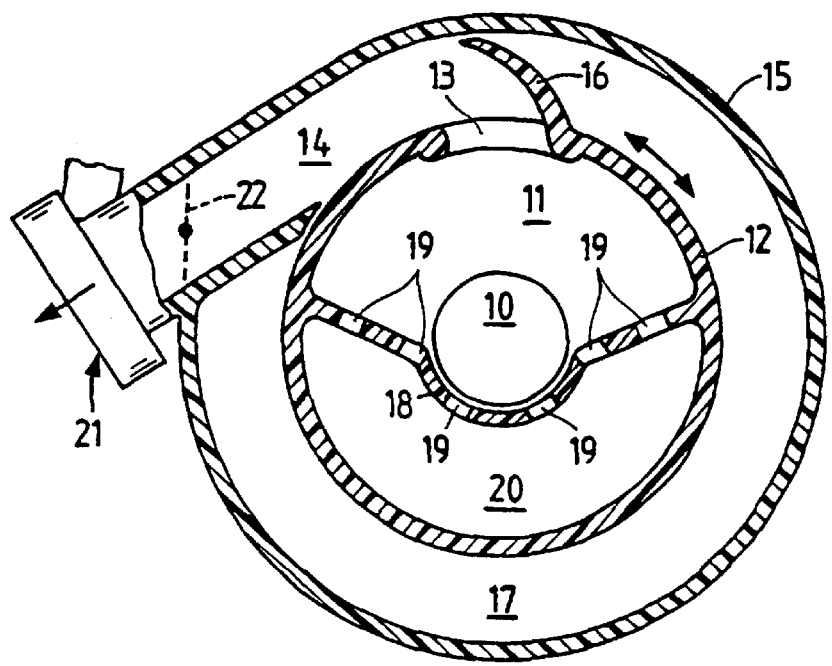
FIG. 1 is a cross section through an intake pipe with a control element embodied as a drum-type controller in which a broadband resonator is integrated.

FIG. 1 illustrates the path of intake air through an intake pipe according to the invention. The air enters through an inlet 10 into a collector chamber 11 formed by a substantially cylindrical control element 12. Through passages 13 in control element 12, the intake air reaches the intake ducts 14, which are formed by parts of the inner wall of a housing 15 forming the intake pipe and by the outer wall of control element 12 and which annularly surround the control element. Through outlets 21, the intake air reaches the cylinder heads (not shown) of an internal combustion engine. Depending on the angular position of control element 12, which can be rotated about its longitudinal axis (perpendicularly to the plane of FIG. 1) the position of passage 13 determines the length of the intake duct 14, as well as the length of the clearance volume 17 on the other side of a tongue 16. A resonator volume 20 acting as a broadband resonator is partitioned off from the collector chamber by a partition 18, which is provided with openings 19. When collector chamber 11 is open toward inlet 10, resonator volume 20 forms a closed volume, except for openings 19. Just in front of outlet 21 of the intake pipe, a throttle 22 (indicated by a broken line) may be provided. This is advantageous, particularly if the collector chamber is used to accommodate an air filter. In this case, a throttle centrally disposed at inlet 10 would operate in the unfiltered air zone of the intake system of the internal combustion engine, which would reduce the reliability of the unit due to the risk of contamination.

Figure 2:
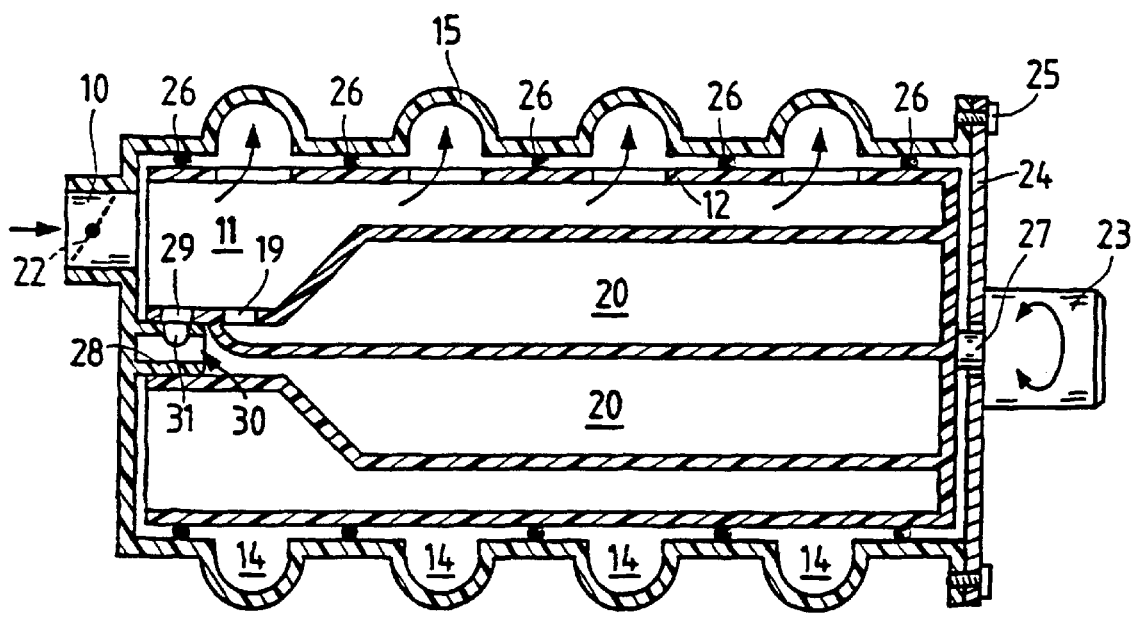
FIG. 2 is a longitudinal section through an intake pipe with a control element embodied as a drum-type controller according to FIG. 1, in which two Helmholtz resonators are integrated.

Further details regarding the functioning of the intake pipe are shown in FIG. 2. The control element 12 is driven by a motor 23, which is mounted to a cover 24 of housing 15. With the aid of fasteners 25, the cover seals the mounting opening for the control element 12. The control element has a cup-shaped design. The open side faces inlet 10 to permit the intake of the combustion air. A throttle 22 (indicated by a broken line) is arranged in the inlet. The individual intake ducts 14 are separated from one another by sliding ring seals 26. The seals 26 are located in the gap between housing 15 and control element 12. The control element is further supported on a motor shaft 27 directly within housing 15. The collector chamber 11 contains two resonance volumes 20, one of which communicates with collector chamber 11 in any operating state of the intake pipe through opening 19. The other resonance volume, which is supported on hollow nipple 28, becomes effective only if a bore 29 in hollow nipple 28 registers or coincides with a slot 31 in a resonator neck 30, so that a connection is created between resonance volume and collector chamber 11. Of course, the two resonance volumes can also be configured as selectively connectable add-on volumes. In this case, the hollow nipple 28 would have to have a larger inside diameter, so that resonator neck 30 can be inserted into the hollow nipple.

Figure 3:
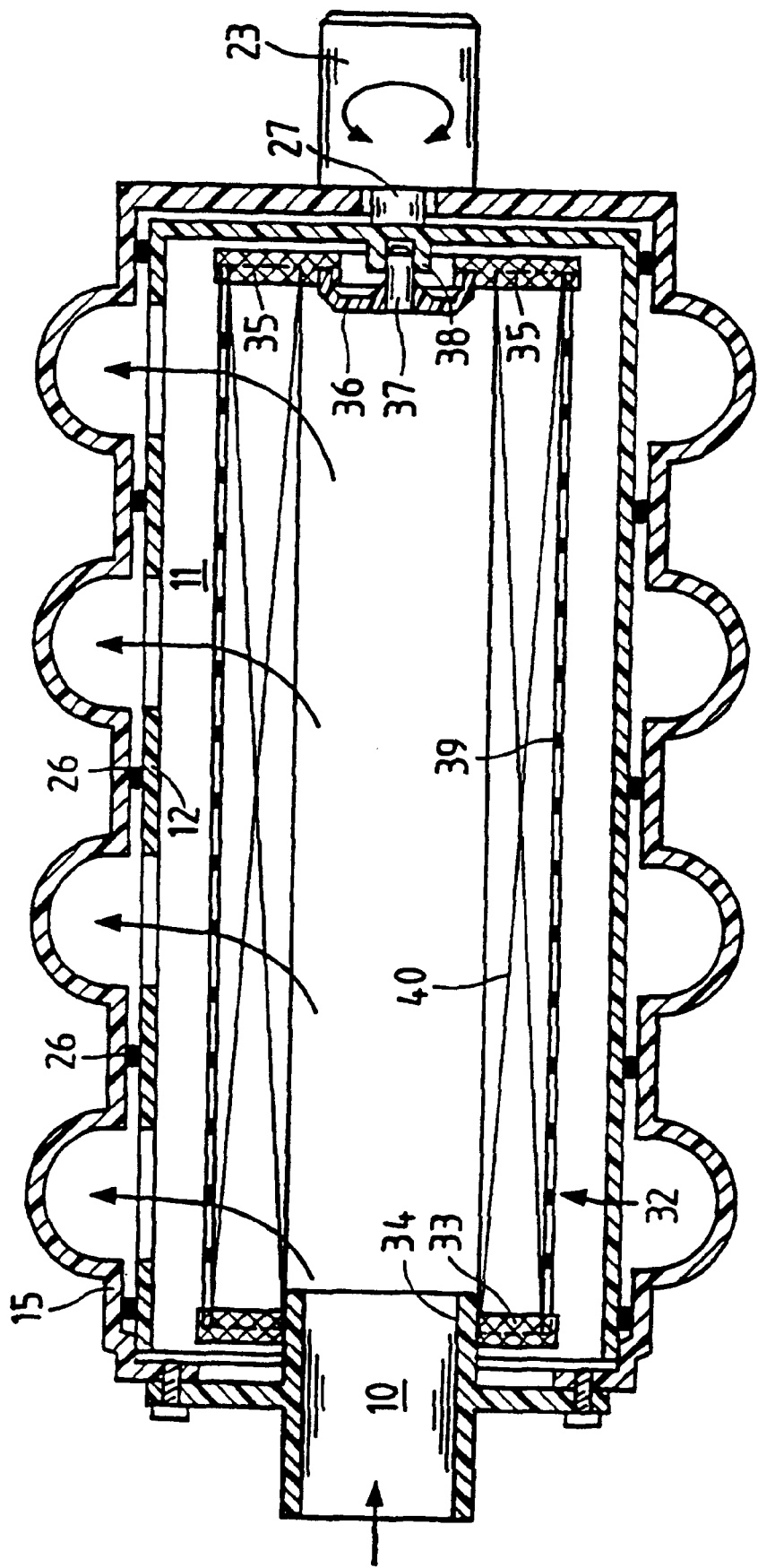
FIG. 3 is a longitudinal section through an intake pipe with a control element embodied as a drum-type controller according to FIG. 1, in which a round filter cartridge is installed.

The intake pipe according to FIG. 3 is constructed similarly to that described in FIGS. 1 and 2, but collector chamber 11, formed by control element 12 is used to accommodate an air filter cartridge 32. The cartridge with an end disk 33, which seals the unfiltered air against the filtered air, is pushed onto a pipe connection 34, which forms inlet 10. Thus, the air filter cartridge 32 is fixedly connected to housing 15 of the intake pipe. Into the other end disk 35, a cover 36 is inserted into which a bearing neck 37 is pressed. Bearing neck 37 interacts with a bearing 38 in the end-face-side wall of control element 12. This provides a rotatable support of air filter cartridge 32 in the control element. The air filter cartridge further has a perforated shell 39, which protects a filter medium 40 against the pulsating pressure of the intake air.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An adjustable intake pipe comprising a housing having an inlet which opens into a collector chamber defining a volume, said collector chamber having at least one intake duct branching off therefrom; said housing further having at least one outlet per intake duct, wherein said collector chamber is formed by a movably supported control element within said housing, wherein at least one other component of an intake tract is accommodated within the control element; said at least one other component comprising at least one resonance chamber, said resonance chamber being formed by a partition which forms a closed resonance volume within the control element, and wherein said resonance volume communicates with said collector chamber via at least one opening through said partition.

2. An intake pipe according to claim 1, wherein said component is fixedly connected to the control element.

3. An intake pipe according to claim 1, wherein said component is fixedly connected to the housing.

4. An intake pipe according to claim 1, wherein said component is movably supported in the control element.

5. An intake pipe according to claim 1, wherein said component is movably supported in the housing.

6. An intake pipe according to claim 1, wherein said at least one opening of the partition is closed or opened by adjusting the control element.

7. An intake pipe according to claim 1, wherein said pipe is an intake manifold forming an air intake tract of an internal combustion engine for supplying combustion air to the engine, and each intake duct leads from a respective one of the outlets of the housing to an associated cylinder of the internal combustion engine.

* * * * *